(12) United States Patent
Al-Hashmy et al.

(10) Patent No.: US 11,808,663 B2
(45) Date of Patent: Nov. 7, 2023

(54) IN SITU LEAKAGE DETECTION SYSTEM FOR BURIED NONMETALLIC PIPELINE

(71) Applicant: Saudi Arabian Oil Company, Dhahran (SA)

(72) Inventors: Hassan Ali Al-Hashmy, Dhahran (SA); Christian Canto Maya, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 209 days.

(21) Appl. No.: 17/343,475

(22) Filed: Jun. 9, 2021

(65) Prior Publication Data

US 2022/0397475 A1    Dec. 15, 2022

(51) Int. Cl.
    *G01M 3/00*     (2006.01)
    *G01M 3/18*     (2006.01)
    *G01M 3/38*     (2006.01)

(52) U.S. Cl.
    CPC .............. *G01M 3/002* (2013.01); *G01M 3/18* (2013.01); *G01M 3/38* (2013.01)

(58) Field of Classification Search
CPC ........... G01M 3/002; G01M 3/18; G01M 3/38
USPC ........................................................ 356/301
See application file for complete search history.

(56) References Cited

U.S. PATENT DOCUMENTS

| | | | |
|---|---|---|---|
| 3,874,222 A | 4/1975 | Ladd et al. | |
| 4,568,925 A | 2/1986 | Butts | |
| 6,519,026 B1 * | 2/2003 | Holland | G01M 11/3109 356/73.1 |
| 7,095,222 B2 | 8/2006 | Davila | |
| 7,334,455 B2 | 2/2008 | Yanagi et al. | |
| 7,574,897 B2 | 8/2009 | Koike et al. | |
| 7,647,820 B2 | 1/2010 | Yanagi et al. | |
| 7,706,640 B2 | 4/2010 | Pizzorno et al. | |
| 8,520,195 B2 | 8/2013 | Ramos et al. | |
| 8,701,469 B2 | 4/2014 | Ober et al. | |
| 8,739,835 B2 | 6/2014 | Sigouin | |
| 8,967,185 B2 | 3/2015 | Fernandes et al. | |
| 9,500,554 B2 | 11/2016 | Kulkarni et al. | |

(Continued)

FOREIGN PATENT DOCUMENTS

| | | |
|---|---|---|
| CN | 1696629 A | 11/2005 |
| CN | 102997052 A | 3/2012 |

(Continued)

*Primary Examiner* — Md M Rahman
(74) *Attorney, Agent, or Firm* — Leason Ellis LLP (57) ABSTRACT

An in situ leakage detection system for protecting and monitoring buried non-metallic pipelines is provided. The system includes flexible composite mats arranged below and above the pipeline. Sensors, including, distributed optical fiber sensors (DOFS) are affixed to the pipe-facing mat surfaces and extend lengthwise along the pipeline. An optical time domain reflectometry (OTDR) reading unit is configured to provide optical signals to the DOFS and analyze the returned optical signal. The OTDR unit can measure frequency and amplitude of anti-Stoke components of Raman scattering signals and a time-distance of the signals to detect localized changes in temperature along the pipeline. The system is further configured to detect leaks and determine a location of the leaks from the foregoing temperature changes and time-distance information. A method of installing and operating an in situ leakage detection system is also provided.

18 Claims, 6 Drawing Sheets

(56) References Cited

U.S. PATENT DOCUMENTS

| | | | |
|---|---|---|---|
| 9,732,911 B2 | 8/2017 | Zulfiquar | |
| 9,909,708 B1* | 3/2018 | Penland, Jr. | F16L 57/00 |
| 10,174,876 B2 | 1/2019 | Suzuta et al. | |
| 2004/0154380 A1 | 8/2004 | Walker | |
| 2006/0225507 A1 | 10/2006 | Paulson | |
| 2008/0122617 A1* | 5/2008 | Browning | G02B 6/4416 |
| | | | 340/541 |
| 2010/0315630 A1* | 12/2010 | Ramos | G01D 5/3537 |
| | | | 356/301 |
| 2011/0007996 A1* | 1/2011 | Huffman | G01M 5/0025 |
| | | | 385/12 |
| 2013/0003501 A1 | 1/2013 | Marquez et al. | |
| 2013/0043887 A1* | 2/2013 | Ziolkowski | F17D 5/06 |
| | | | 324/649 |
| 2017/0350561 A1 | 12/2017 | Wagg et al. | |
| 2019/0071965 A1 | 3/2019 | Jaaskelainen et al. | |
| 2019/0107459 A1 | 4/2019 | Lin et al. | |
| 2019/0120703 A1* | 4/2019 | Mitsunari | G01K 11/32 |
| 2021/0115786 A1* | 4/2021 | Cerrahoglu | E21B 47/113 |
| 2021/0123817 A1* | 4/2021 | Champavere | G01D 5/35364 |

FOREIGN PATENT DOCUMENTS

| | | | | |
|---|---|---|---|---|
| CN | 103047540 B | | 12/2015 | |
| DE | 2202826 A1 | | 8/1972 | |
| EP | 3502467 A1 | * | 6/2019 | F03D 1/0675 |
| FR | 3015029 A | | 6/2015 | |
| GB | 2529674 A | * | 3/2016 | G01D 5/353 |
| GB | 2540260 A | | 1/2017 | |
| WO | 1996026425 A1 | | 8/1996 | |
| WO | 2006064284 A1 | | 6/2006 | |
| WO | WO-2008083066 A2 | * | 7/2008 | B29C 70/32 |
| WO | 2020003023 A1 | | 1/2020 | |

\* cited by examiner

IN SITU LEAKAGE DETECTION SYSTEM FOR BURIED NONMETALLIC PIPELINE

FIELD OF THE DISCLOSURE

The present disclosure relates generally to a sensor system network and protective matting for pipeline structures, and specifically to an in situ leakage detection system and protective matting for monitoring in an around an underground nonmetallic (composite) pipeline.

BACKGROUND OF THE DISCLOSURE

The encroachment of existing buried high-pressure pipeline corridors and storage vessels due to factors such as above-ground building and construction activities presents a high risk to the integrity of the underground pipelines and vessels. This can result in a loss of product from leaks in the underground structures caused by external damage, which can lead to health, safety, and environmental issues. The protection of buried pipeline networks from impact damage is important to operators of the pipelines and other third parties that have a vested interest where encroachment is taking place.

Other causes of pipeline incidents include mechanical failure, human error and structure degradation. Pipelines operators carefully build, maintain and monitor the integrity and security of their lines. They invest in employee training and actively work to prevent corrosion and mechanical and human error. In addition, they work with professional excavators and homeowners to prevent unintentional damage to lines due to excavation activity.

Other important damage mechanisms related to poor installation practices are the pipeline failures due to abrasion or in other words impact/low velocity impact (LVI) known as third-party damage. Abrasion in composite pipe is caused by sharp objects, usually rocks that wear the pipe's external surface. The damage caused to the external resin surface leads to water infiltration in the glass/resin matrix jeopardizing the mechanical strength of the pipeline and the consequent failure over time.

It is in regard to these and other problems in the art that the present disclosure is directed to provide a technical solution for an effective protection and sensor system for monitoring buried nonmetallic pipelines.

SUMMARY OF THE DISCLOSURE

According to an embodiment, an in situ leakage detection system for a buried nonmetallic pipeline is provided. The system comprises one or more elongate flexible composite mats that extend in a lengthwise direction along a length of the pipeline. The or more mats have an inner surface and are arranged to face an exterior surface of the pipeline, an exterior surface and a thickness therebetween.

The system also includes at least one distributed optical fiber sensor (DOFS) affixed to the inner surface of the one or more mats and extending lengthwise along the one or more mats for the length of the pipeline. The at least one DOFS have an input end configured to be coupled to an optical time domain reflectometry (ORDR) reading unit.

The system also comprises a monitoring computing system comprising the OTDR reading unit. The OTDR reading unit is configured to provide an optical input signal to the input end and measure parameters of a returned optical signal. Furthermore, the computing system is configured to detect a leak in the pipeline and a location of the leak as a function of the measured parameters.

According to a further aspect, a method of protecting a buried nonmetallic pipeline using an in situ leakage detection system is provided. In particular, the method comprises the step of providing an in situ leakage detection system under ground in relation to the nonmetallic pipeline. In particular, the in situ leakage detection system comprises one or more elongate flexible composite mats. The one or more mats extend in a lengthwise direction along a length of the pipeline and have an inner surface arranged to face an exterior surface of the pipeline, an exterior surface and a thickness therebetween. The detection system also comprises at least one distributed optical fiber sensor (DOFS) affixed to the inner surface of the one or more mats. The at least one DOFS extend lengthwise along the one or more mats for the length of the pipeline. Additionally, the at least one DOFS having an input end configured to be coupled to an optical time domain reflectometry (ORDR) reading unit. Further, the detection system includes a monitoring computing system provided above ground and comprising the OTDR reading unit that is optically coupled to the input end of the at least one DOFS.

The method further comprises the step of providing an optical input signal with the OTDR reading unit to the input end of the at least one DOFS. Furthermore, the method includes the steps of measuring, with the OTDR reading unit from the input end, parameters of a returned optical signal and detecting, with the computing system, a leak in the pipeline and a location of the leak as a function of the measured parameters.

These and other aspects and features can be appreciated from the following description of certain embodiments together with the accompanying drawings and claims.

BRIEF DESCRIPTION OF THE DRAWINGS

It is noted that the drawings are illustrative and not necessarily to scale, and that the same or similar features have the same or similar reference numerals throughout.

DETAILED DESCRIPTION OF CERTAIN EMBODIMENTS OF THE DISCLOSURE

In various example embodiments, an in situ leakage detection system for a buried nonmetallic pipeline is provided. The detection system comprises a sensor network that is integrated with flexible composite mats which are installed underground with the pipeline so as to extend lengthwise along the pipeline, for instance, above and below it. The sensors can comprise fiber optic sensors and are configured to extend lengthwise along the flexible composite mats and are used to detect temperature differences along the pipeline and, as a result, gas and/or fluid leakage. The system is used to protect and monitor buried or subsurface infrastructure (e.g., pipelines) and, more particularly, nonmetallic pipelines, that is, a pipeline made of a composite material, not steel.

Figure 1:
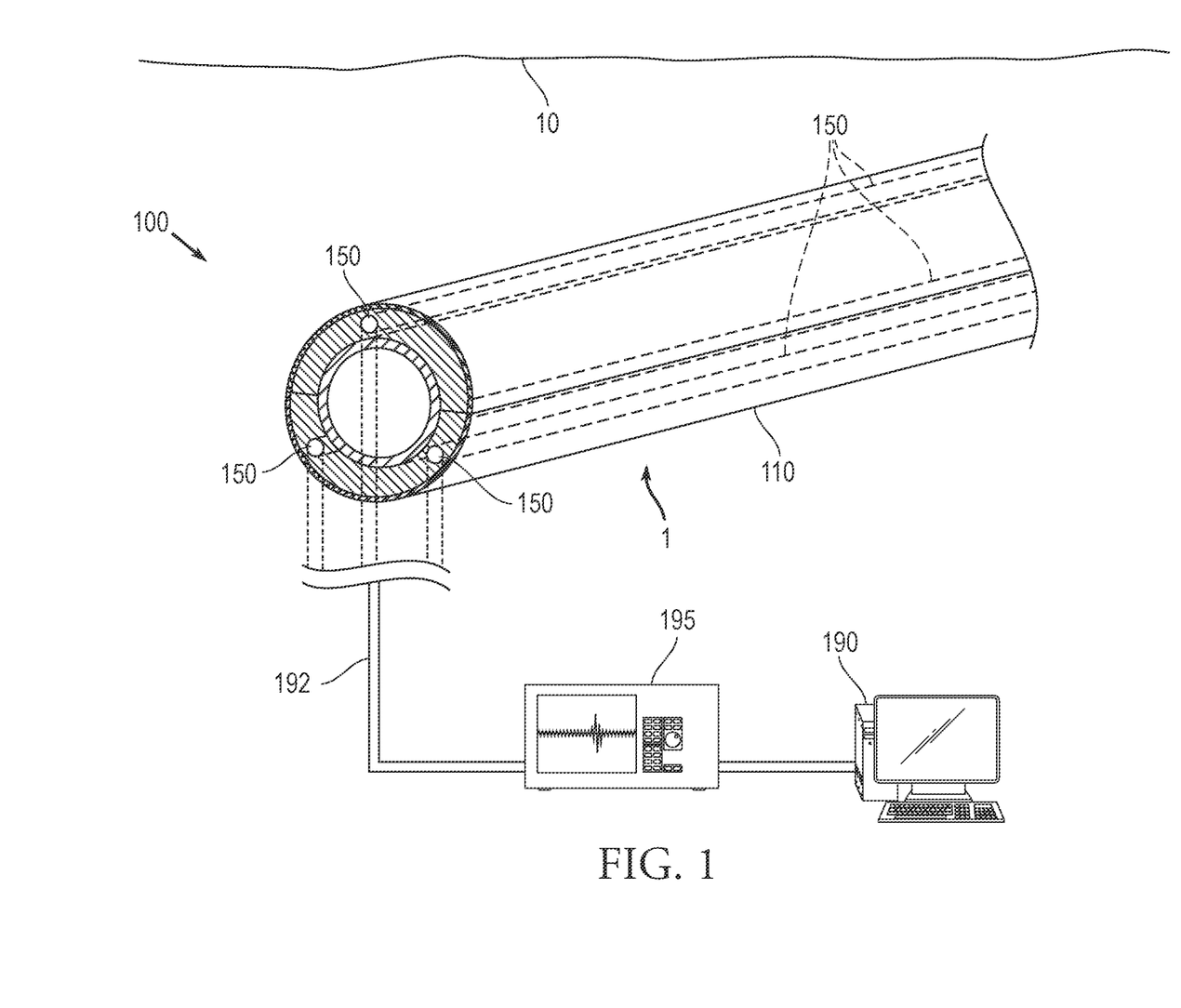
FIG. 1 is an illustration of a system for in situ leakage detection for a buried nonmetallic pipeline, according to an embodiment.

FIG. 1 illustrates an exemplary configuration of an in situ leakage detection system 100 for the protection and monitoring of a buried nonmetallic pipeline 1. The system 100 comprises a plurality of sensors 150 that extend in the lengthwise direction (e.g., along the length of the pipe) and configured for actively monitoring for leaks in the pipeline. The system further comprises one or more flexible composite mats 110 having an inner surface, an exterior surface and a thickness therebetween. The mats function as a structural support for the pipeline and protect the buried pipeline 1 against damage, such as unintentional excavation damage and damage to the pipeline surface from the surrounding soil sediment. The pipeline and mats are buried underground, however, for clarity, FIG. 1 illustrates only the ground surface 10 and omits the soil that would be backfilled around the pipe 1 and mat 110 after installation.

Figure 5:
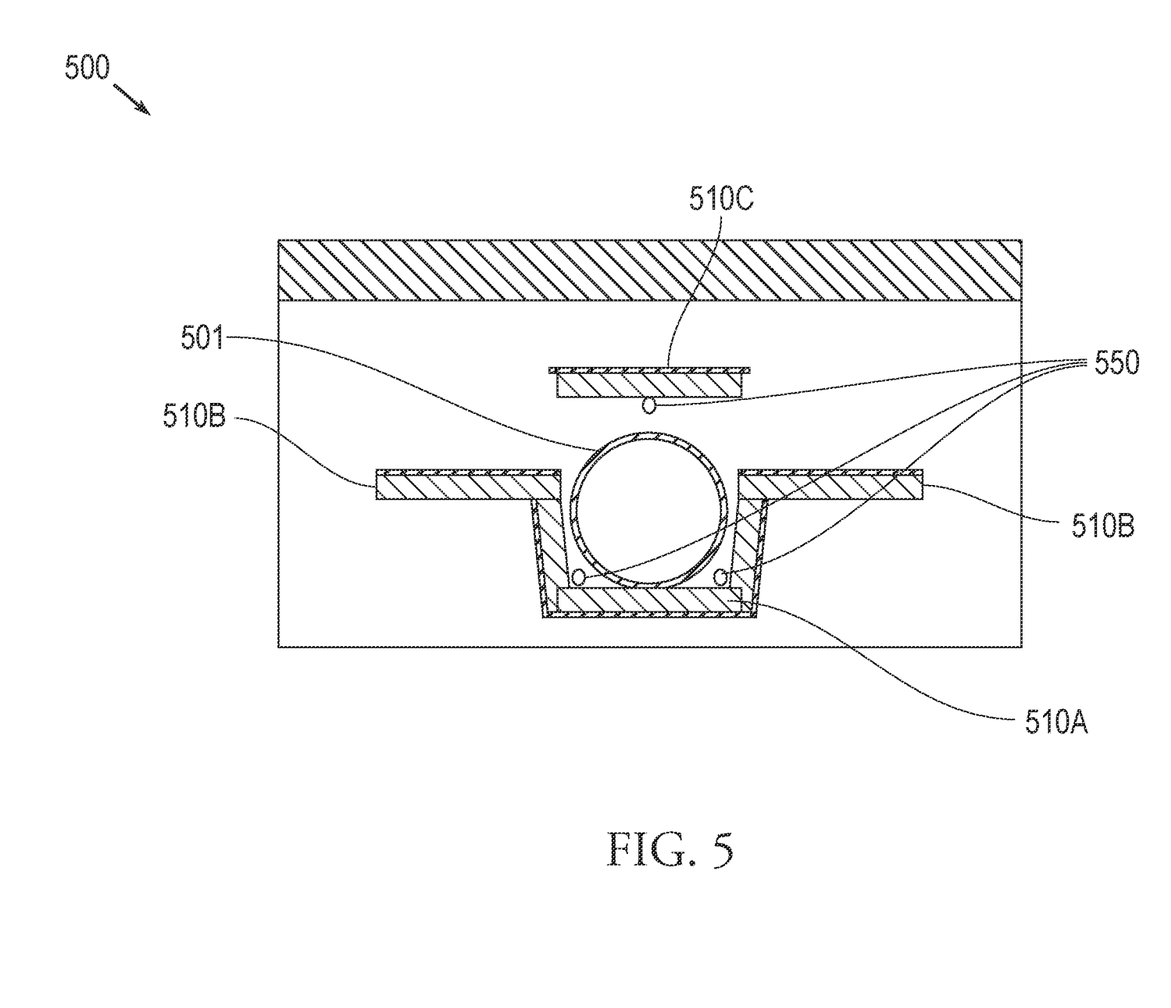
FIG. 5 is a cross-section schematic showing an exemplary configuration of an in situ leakage detection system according to an embodiment.

As shown in FIG. 1, in an embodiment, a plurality of flexible composite mats 110 are arranged to extend lengthwise along the length of the pipeline. For example, one mat is provided to cover the top half of the pipeline and the second mat is provided below to cover the bottom half. The mats are preferably made of a material that is flexible and thus can conform to the curvature of the pipeline such that the inner surface of the mat abuts the outer surface of the pipeline. It should be understood however that more or fewer mats, in various configurations, can be used to surround and protect the pipeline. For example, FIG. 5 is a cross-section schematic showing another exemplary arrangement of an in situ leakage detection system 500 comprising flexible mats 510A-510C and affixed sensors 550 positioned relative to a pipeline 501 according to an embodiment. Rigid composite pipelines can require a flat trench bottom to avoid poor support, for example. Accordingly, as shown as shown in FIG. 5, one or more mats 510A are arranged within the soil trench to define a generally U-shaped trough within which the pipe 501 can be placed. Two sections of mat 510B, which can be integrally formed with mats 510A or provided as separate structures, can be arranged to extend horizontally outward from respective top ends of the trough defined by mat 510A. A top mat 510C is positioned above the pipe and includes one sensor 550 extending lengthwise along the midpoint of the mat 510C. As shown, the top mat 510C can be set some distance away from the top of the pipe such that a layer of backfill is provided between the pipe and the top mat. Additionally, as shown in FIG. 5, two sensors 550 can be affixed to the inner surface of the bottom mat 510A and arranged to extend along a bottom left and bottom right corner of the trough.

Returning to FIG. 1, the exemplary flexible composite mats 110 (and mats 550A-C) can be made of a material such as a thermoplastic polymer, thermoplastic elastomer, rubber and the like. In one embodiment, the protective mat comprises a flexible composite mat fabric. Suitable mat fabrics are shown and described in co-pending and commonly assigned U.S. patent application Ser. No. 17/155,971, filed Jan. 22, 2021, and U.S. patent application Ser. No. 17/223,692, titled "Automated System and Installation Process for a Flexible Mat Fabric," filed on Apr. 6, 2021, which are each expressly incorporated by reference herein in their respective entireties.

In an embodiment, the settable material can be a powder material composed of fine, medium and coarse construction aggregates, such as sand, crushed stone, gravel, slag, recycled concrete, etc.) that are bound with a hydrolic cement that is capable of setting and hardening by hydration reactions when water is added into it (e.g., Portland cements). The settable materials can also comprise non-hydrolic cement that can be hardened by carbonation reactions with carbon dioxide.

As will be appreciated, the cementitious mixture is capable of in-situ hydration (e.g., hydration in place, on location, on a construction site). In-situ hydration occurs as a liquid, such as water, is topically applied and reacts with a volume of cementitious material within a cementitious composite that is defined by a spacer fabric layer and the settable materials included in cells of the fabric layer. Hydration of cementitious composite mats (e.g., mat 110) can be initiated in-situ (e.g., in place, on a job site, etc.). The cementitious composite mat may be transported to an install location as a flexible composite material in a pre-packaged configuration (e.g., sheets, rolls, etc.) and hydrated on-location as by adding a setting agent, such as water.

The settable material can also be a polymer modified cementitious mixture comprised of cement mixed with one or more organic polymers that are dispersed or redispersible in water, with or without aggregates, capable of hardening and setting. The organic polymer can be a homopolymer, a copolymer when two or more monomers are copolymerized, or a mixture of two or more polymers (homopolymers and/or copolymers). Several polymers can be used for such application, including but not limited to, synthetic elastomeric latexes (e.g., polyvinyl acetate, polyacrylic esters, styrene-acrylics, vinyl acetate copolymers, polypropylene, polyvinylidene, chloride copolymers, etc.); thermosetting latexes (e.g., asphalt, paraffin, coal-tar, etc.) can be used. The organic polymers used for such application are generally produced by polymerization, mainly emulsion polymerization of the monomers in presence of water, a surfactant, and an initiator that generates free radicals and makes the monomers polymerize. Other components can be used in the polymerization process, such as antifoaming agents, plasticizers, or other additives can be used to control molecular weight, etc.

Several monomers can be used including but not limited to styrene, vinyl acetate, acrylate esters (such as n-butyl acrylate, 2-ethyhexyl acrylate, ethyl acrylate, methyl methacrylate, etc.), acrylonitrile, acrylamide, butadiene, vinylidene chloride, vinyl chloride, ethylene, etc.

The organic polymers can be used as a dispersion in water (e.g., latex), a redispersible powder, or a water soluble or redispersible liquid. In some instances, monomers can be added to the cement and can be polymerized in-situ by adding the setting agent (e.g., water). Redispersible polymer powders are mainly used by dry mixing with the cement and aggregate premixes followed by wet mixing with water where the redispersible powders are re-emulsified. This results in hardening of the material to a rigid or semi-rigid solid. In one embodiment, one preferred optimal degree of polymer degree is achieved at polymer-to-cement ratios (p/c) between about 5 and about 20 weight (wt.) %, but depending on the application and targeted properties, these ratios can go up to about 40 wt. %.

In polymer-modified concrete and mortar, aggregates are bound in a polymer-cement co-matrix where polymer phase and hydrated cement phase interpenetrate resulting in higher performance and superior properties compared to conventional concrete and mortar where microcracks can occur easily under stress mainly due to the fact that calcium silicates hydrates and calcium hydroxide are bound with weaker Van der Waals forces, which leads to poor tensile strength and fracture toughness. In contrast, when organic polymers are added, the organic polymers fill and close the gap and pores, seal the microcracks and therefore prevent their propagation, which leads to higher strength (tensile and flexural) and fraction toughness of the polymer-modified concrete or mortar. The use of organic polymers leads also to the improvement of numerous properties of the concrete and mortar, such as the hardness, barrier properties and permeability, etc. In general, these improvements tend to increase when the polymer content increases, as the porosity tends to decrease when the polymer-to-cement ratio increases.

Other additives can be used with the organic polymer to enhance certain properties, such as thermal and UV resistance, flammability, impact resistance, etc., including but not limited to UV absorbers (e.g., benzotriazole, HALS, etc.); antioxidants (e.g., phenolics, phosphites, etc.); impact modifiers (acrylics, styrenic copolymers, synthetic rubbers, etc.); flame retardants (FRs) (e.g., halogenated FRs, phosphorous FRs, nitrogen-containing FRs, such as melamine, melamine cyanurate, etc. and inorganic FRs, such as aluminum hydroxide magnesium hydroxide, antimony trioxide, etc.). Intumescent flame retardants can also be used by mixing an acid source, such as ammonium polyphosphate, a blowing agent, such as melamine and a carbon source, such as a polyol.

It is desirable to use composite materials in the oil and gas industry and one of the main areas where non-metallic materials are being utilized is in the pipeline sector. Installation problems are usually the main cause of premature failure in composite pipelines. The fragile nature of the composite pipelines requires special attention on the soil quality and uniform terrain at the time of installation. A proper installation of a composite pipe requires to have an adequate soil quality to provide proper support to the pipeline. It is also important to ensure high soil quality to avoid the existence of rocks in the trench. Improper backfilling and poor soil support are installation deficiencies that make the composite pipe prone to premature failure. Lack of support leads to uneven pipeline settlement in the trench causing excessive axial or shear stress in the pipe body or pipeline joints leading to premature pipeline failure. Rigid composite pipelines can require a flat trench bottom to avoid poor support, for example, as shown in FIG. 5. The flexible composite mat 110 serves to alleviate the problem of soil uniformity, as well as reduce the time and effort required to prepare the required trench quality. The flexible composite mat 110 ensures the proper distribution and support of the pipeline in the terrain. Moreover, flexible composite mat 110 acts as an interphase between the soil and the pipe alleviating the soil quality requirement for the pipe installation.

The mat 110, which is a composite structure that is flexible at least prior to and during the installation process, also provides a platform for efficient installation of the sensors 150. The mat provides the ideal localization of the sensors 150 relative to the pipeline. The mat provides the ideal depth position of the sensors and maintains the sensors in proper proximity to the pipeline being monitored. In other words, the flexible composite mat situated against or near the pipeline's outer surface maintains the sensors in contact with or proximity to the surface of the pipeline and maintains the sensors at their respective circumferential position as the sensors extend lengthwise along the length of the pipeline.

Figure 2A:
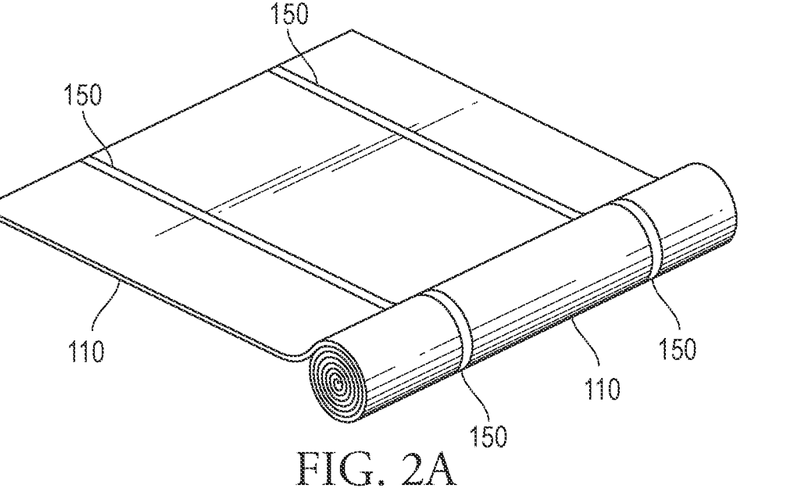
FIG. 2A is an isometric schematic of an exemplary flexible composite mat and two elongate optical fiber sensors shown in a partially rolled up configuration, according to an embodiment.
Figure 2B:
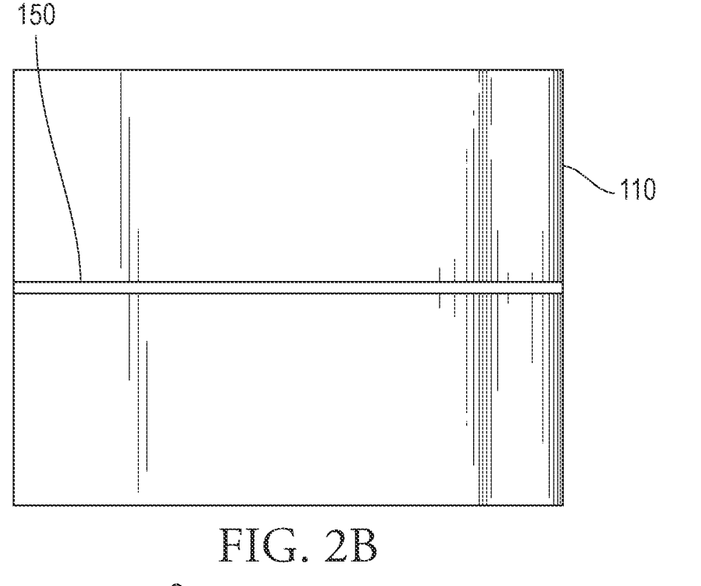
FIG. 2B is a top view schematic of an exemplary flexible composite mat and elongate fiber optic sensor shown in a partially rolled up configuration according to an embodiment.
Figure 2C:
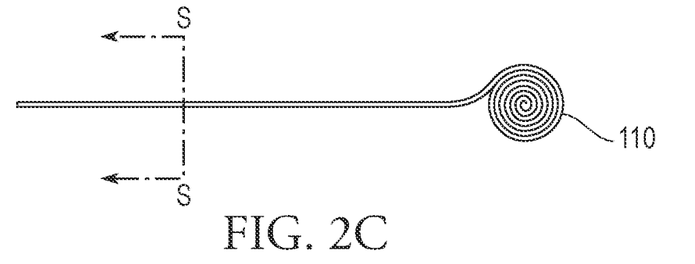
FIG. 2C is a side-view of an exemplary flexible composite mat shown in a partially rolled up configuration according to an embodiment.

FIG. 2A is an isometric schematic of an exemplary assembly comprising the flexible composite mat 110 and two sensors 150, which comprise elongate optical fibers, stitched onto an inner surface of the mat, according to an embodiment. As shown, in the configuration of FIG. 2A, the two fiber optic sensors 150 extend lengthwise along the mat in a parallel arrangement. Such a mat and sensor arrangement can be used, for example, for the bottom mats shown in FIG. 1 or 5 that support the pipeline from below. It should be understood that the size of the fiber optic is exaggerated for illustrative purpose and a common fiber optic diameter can be between is 0.25 to 0.5 mm, for example. FIG. 2B is a top view schematic of an exemplary assembly comprising one fiber optic sensor 150 stitched onto the inner surface of a flexible composite mat 110 according to an embodiment. As shown, the fiber optic sensor is provided near the mid-point of the mat in the width-wise direction and extends lengthwise for the length the mat, which is shown in a partially rolled-up configuration. Such a mat and sensor arrangement can be used, for example, for the mats shown in FIG. 1 or 5 that are placed over the top of the pipeline. FIG. 2C is a side-view of the exemplary mat 110. FIGS. 2A-2C each show the assembly comprising the mat and one or more sensors in a partially rolled/unrolled configuration. It should be understood that, in order to cover long lengths of a pipeline, a plurality of mat segments can be joined or otherwise arranged in series to provide a mat 110 having a sufficient length (e.g., 30 km). Sensors 150 can similarly be defined by segments that are joined in series. Additionally, multiple mat segments can be joined or arranged side-by-side to define a mat having a sufficient width for the intended application. For example, the bottom mat 510A that defines the U-shaped trough shown in FIG. 5 can comprise a plurality of mats arranged side-by-side.

Returning now to FIG. 1, the sensors 150 are sensing devices that are usable to measure one or more of a variety of different parameters near the pipeline 1 that are usable to monitor the conditions and integrity of the pipeline. Additionally, the sensors can define a sensor network that can further include programmable, reconfigurable, or custom logic or circuits configured (e.g., programmed or otherwise designed) to carry out the intended sensing or other monitoring tasks (such as identifying any abnormal conditions).

The sensors 150 can be one or more of embedded within the mat 110, directly or closely attached to the mat (e.g., by stitching), woven into the mat, or a combination of the foregoing. Furthermore, in some embodiments, a portion of a sensor, such as a sensor probe can be exposed on or through the inner surface of the mat, while the cables (e.g., wires or optical fibers) connecting such sensor probe elements with other such components of the sensor network or monitoring system are otherwise embedded within the thickness of the mat for protection.

In an embodiment, the sensors 150 are fiber optic sensors (FOS), for measuring one or more of a variety of parameters usable to infer the health of the pipeline and surrounding underground environment. Such sensors can comprise elongate optical fibers that are attached to the surface of the mat 110 by stitching such that they are exposed directly to the pipeline and extend along the length of the mat and corresponding length of the pipeline. The sensors are preferably positioned on the pipe-facing, "inner surface" of the mat, thereby locating the sensors directly on or near the pipeline without influence of soil sediment, which is backfilled around the pipeline and surrounding mat 110 structure to complete installation.

In an embodiment, the sensors 150 are FOSs configured to measure temperature differences around and along the pipeline, a parameter which is usable to detect leaks. While a change in temperature can be due to seasonal temperature changes, an abrupt or unexpected change sensed by the sensor can be used infer a change in the surrounding temperature caused by a leak in the pipeline.

However, it should be understood that other types of sensors can be used to measure temperature or other parameters indicative of abnormal conditions of the buried pipeline. Other types of sensing devices for performing leakage detection can include, for example, humidity sensors and gas sensors, to name a few. In addition or alternatively, one or more of the sensors can also be made to measure other parameters such as, but not limited to, strain, pressure, rotation, acceleration, pH, and corrosion.

For example, in some embodiments, one or more sensors can be configured to measure and monitor a humidity level of the surrounding area. Similar to temperature, humidity changes can be associated with seasonal changes and thus the monitoring system can be configured to filter out or ignore such changes. However, the monitoring system can be configured to detect an abrupt or unexpected change in humidity measured by the sensor and to infer a change in the liquid content surrounding the pipeline caused by a leak.

In some embodiments, one or more sensors can include a gas leak sensor for use with pipelines that house or transport gases (with or without liquids). The gas leak sensors are configured to detect gas or elements of gas. A detection of an unexpected gas can be due, for example, to a leak in the pipeline. One exemplary gas-leak sensor configurations can include two fiber optic segments separated by a chamber such that the light is traveling along the first fiber, entering the chamber and exiting into another fiber and wherein any gas in the chamber absorbs the light creating a measurable change in intensity or spectrum of the light.

The described techniques herein can be implemented using a combination of fiber optic sensors, transmitters, and other sensors and devices including communications connections, and computing or other logic circuits configured (e.g., programmed) to carry out their assigned tasks. In some example embodiments, the control logic is implemented as computer code configured to be executed on a computing device (such as a microprocessor) to perform the information processing and monitoring steps that are part of the technique. For ease of description, this processing logic (e.g., ASIC, FPGA, processor, custom circuit, or the like) will be referred to as a control computing device throughout.

In some embodiments, the sensors 150 can be coupled to one or more control circuits programmed (or otherwise configured) to operate the sensors 150 and monitor the various measurements captured using the sensors to infer useful information on the integrity of the pipeline. The "control circuit" can be incorporated into the embedded network of sensors and/or realized using remote sensor data processors that are in communication with the sensors such as a monitoring computing system. For ease of discussion, in an exemplary embodiment and as shown in FIG. 1, the system 100 comprises an external monitoring computing system 190 that is directly or indirectly communicatively coupled to the sensors 150 (e.g., via an optical signal communications connection 192) and that is configured to receive and analyze the information obtained using respective sensors to detect pipeline leaks and otherwise implement various other features and functions of the system.

In an embodiment, leakage detection is based on temperature differences measured around and along the pipeline using the sensors 150, which are fiber optic sensors. There are many type of FOSs. One category of FOS is interferometric sensors, which include Fabry-Perot, Mach-Zender, Michelson and Sagnac type sensors. Another category of FOSs are grating-based sensors, which can include, fiber Bragg gratings, Long period grating, chirped fiber Bragg gratings, and the like. Another category of FOSs are distributed optical fiber sensors (DOFS), which operate on principles including Raman scattering, Rayleigh scattering and Billouin scattering.

In the Oil and Gas industry application of the present disclosure, the sensors 150 for detecting leakage of the buried pipeline 1 are preferably optical fiber sensors and, more specifically, distributed sensors (DOFS). The DOFS can offer environmental measurements based on three classes of optical signal scattering, Raman, Rayleigh and Brillouin. Each one of these scattering has its own application. In an embodiment, the system 100 is configured for capturing temperature measurements using Raman scattering, which is the most sensitive to temperature and capable of measuring temperature at 0.01° C. resolution. Raman scattering takes place as result of changes in temperature at a location along the optical fiber causing backscattered light intensity fluctuations from that location. The shift in frequency mechanisms of the backscattering consists of Stoke and Anti-Stoke components. The temperature variation changes can be observed in the Anti-Stoke components, while it does not influence the amplitude of the Stoke components. To measure Raman scattering, commercial optical time domain reflectometers (OTDR) can be used. More specifically, as shown in FIG. 1, the control computing device 190 can comprise or be coupled to an OTDR reading unit 195. Such devices send short pulses into one end of a respective DOFS and analyze the time-distance related to scattering signals with regards to frequency and amplitude. This allows the OTDR reading unit to acquire any temperature difference and respective time-distance along the fiber optic sensor.

Figure 3:
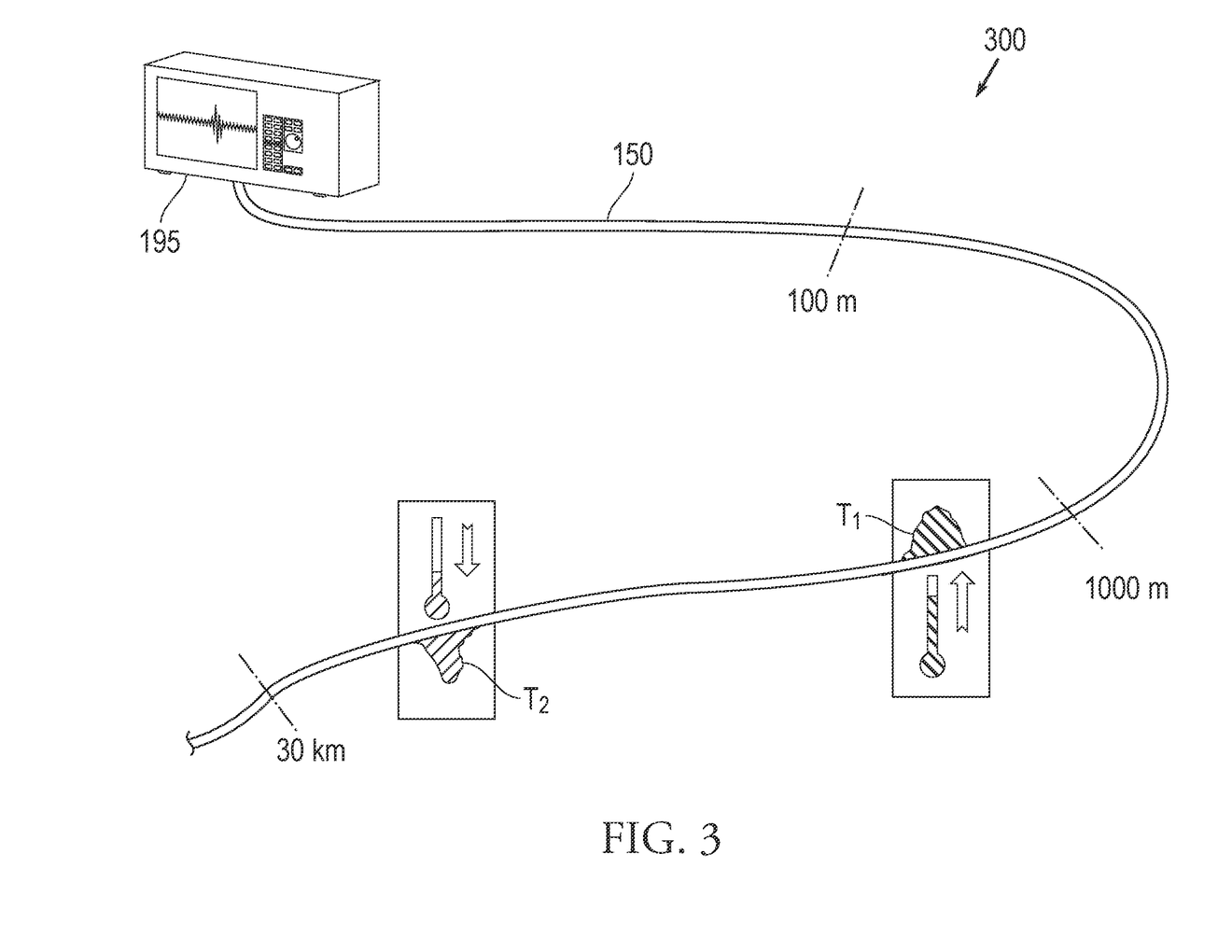
FIG. 3 is a conceptual diagram illustrating an exemplary configuration of an in situ leakage detection system, according to an embodiment.
Figure 4:
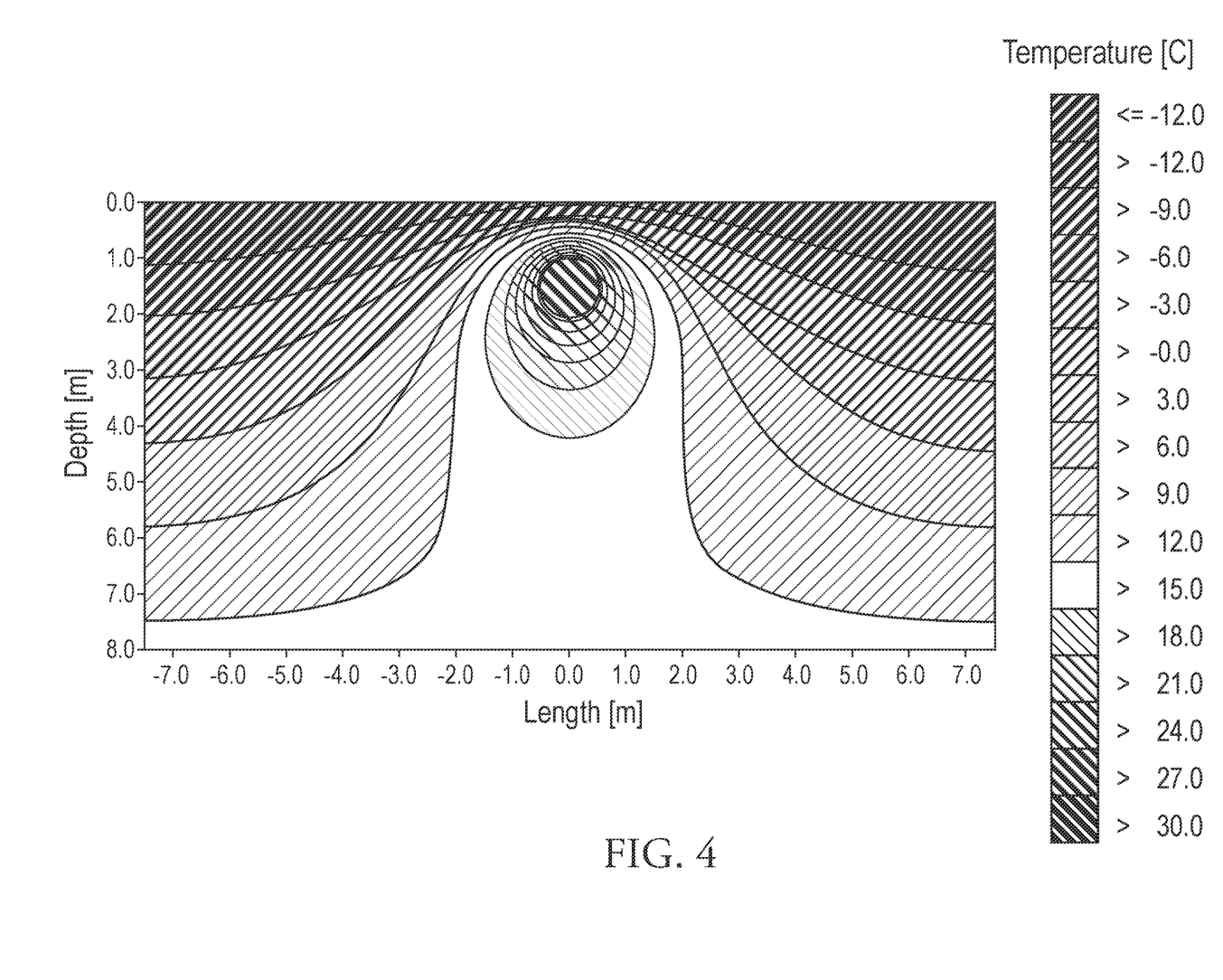
FIG. 4 is a graphical representation of a cross-sectional soil temperature profile for a particular location along a buried pipeline according to an embodiment.

FIG. 3 is a simplified conceptual diagram showing the basic working principle of an in situ leakage detection system 300 using OTDR and a single DOFS type sensor 150 according to an embodiment. In practice, the maximum range of sensing for a Raman-type DOFS sensor system can be around 20 to 30 km. An exemplary control computing device 190 (not shown) can be operatively connected to an OTDR reading unit 195, which is coupled to a first end of the DOFS 150 that extends, for instance, 30 km in length along the pipeline (not shown). The OTDR reading unit operates as both an optical source configured to send short optical pulses into the DOFS and a reader/detector configured to receive and analyze the time-distance related to Raman scattering signals received back at the OTDR reading unit with regards to frequency and amplitude. As illustrated in FIG. 3, this can enable the OTDR reading unit 195 to, say, measure an increase in temperature occurring along a segment of the DOFS 150 around a first time-distance T1, and measure a decrease in temperature occurring along another segment of the DOFS around a second time-distance T2. In this manner, the monitoring computer system 190 and an OTDR reading unit 195 and sensors 150 can be configured to detect localized changes in temperature that are representative of pipeline leakage and, from the time-distance (e.g., T1 and/or T2) accurately determine a corresponding location along the length of the pipeline that the leakage is occurring. Moreover, the arrangement of the multiple sensors 150 (e.g., three DOFS) on the mats 110 and placement of the sensors and mats in relation to the pipeline 1 such that the sensors are maintained at respective circumferential positions about the pipeline further enables the measurement of differences in temperature about the circumference of the pipeline. For example, FIG. 4 is a graphical representation showing a cross-section of the soil temperature profile and temperature difference measured around a buried pipeline at a particular location along its length using the system 100 and/or 300.

Typically, detecting and locating leakage in buried pipeline networks could take many hours and sometime days which could cause loss of production, extensive utilization of manpower for searching and environmental hazard. As can be appreciated, the exemplary systems for in situ leakage detection for buried nonmetallic pipelines, are configured to detect leakage and accurately determine a corresponding location while the pipeline is in service, thereby reducing the time and effort required to locate a leak and perform repair.

Although the type of sensors 150 integrated with the mat 110 is preferably a DOFS, the sensors 150 are not all limited to this type, as other types can be used. For example, interferometric sensors based on Mach-Zender and Michelson interferometers as well as grating-based sensors based on long period grating (LPGs) are usable for monitoring structural health of the pipeline. In addition, other type of sensing devices can be integrated with the flexible composite mat such as capacitive sensing devices configured to measure the changes in the dielectric constant of the medium surrounding the sensor. In addition, or alternatively, the sensors can comprise other commercially available sensors that are able to detect temperature difference, gas and/or fluid leakage.

Optical fibers such as those used for the sensors 150 are, in general, transparent and made from glass or plastic. They are flexible (having a characteristic bend radius which determines the level of maximum flexibility). They are capable of transmitting light over long distances. As would be understood, a single optical fiber contains a core, which is the central part of the fiber where the majority of the light travels. The core is surrounded by a cladding which has a different refractive index (optical impedance) that is selected to produce total internal reflection of the light, i.e. the light is reflected back into the core at the cladding core interface allowing the light to travel along the optical fiber. To protect the fiber, a plastic buffer coating surrounds the cladding layer (e.g., to protect the fiber from breaking and moisture).

Optical fiber sensors are preferably used in the system 100 due to their size, flexibility and because they do not require electrical power or conduct electricity and are immune to electromagnetic interference. As a result of their characteristics (e.g., small size and flexibility), fiber optics are an ideal solution for integrating with the flexible composite mat 110, where little to no negative effects are resultant on the reliability and strength of the optical fiber. There are two main types of fiber optic sensors, namely, intrinsic and extrinsic sensors. Extrinsic sensors take advantage of the fiber as the transmission channel between the point of measurements and the sensor. In other words, in extrinsic sensor configurations the measured change occurs outside the fiber and the fiber remains unchanged and is only the conduit of sensor information. For intrinsic sensors, the fiber is used as the sensing element. In other words, changes to the environmental parameter causes detectable changes to take place within the fiber. In the exemplary sensors of the system 100, the sensors 150 are preferably of the intrinsic type of FOS. However, in addition or alternatively, extrinsic sensors can be used.

With an intrinsic sensor, several parameters of the light including intensity, time of flight, phase, polarization and wavelength can be measured to identify and quantify the various environmental parameters of interest. As discussed above, intrinsic sensors can be configured to measure various parameters including temperature. Additionally, in some embodiments of the system 100, several sensors can be implemented along a single length of one or more of the flexible mats. The sensors 150 are distributed appropriately about the circumference of the pipeline (e.g., sparsely, densely) throughout to provide sufficient coverage for their intended measuring purpose, balancing factors such as cost, redundancy, wiring complexity, and the like.

There are a variety of ways of deploying or affixing the sensors 150 to the flexible composite mats 110. In some embodiments, the sensors are pre-installed on spooled flexible composite mats, as shown in FIGS. 2A-2C. In some such embodiments, the sensors 150 and any connection circuitry along with the optical input/output connections can be installed onto the mat during spooling of the mat into the roll form shown in FIG. 2A-2C for example. In some such embodiments, the sensors are fixed in place using stitching. In some embodiments, the sensors can be fixed in place using an adhesive, such as an epoxy-based adhesive. In some such embodiments, any connection wires or fibers (if present) are also spooled with the flexible composite mat. As such, when deploying the spooled composite matting at the appropriate point within a trench or in relation to the pipeline, the corresponding sensors 150 are also deployed. Final connections, such as to the above-ground OTDR reading unit 195, can be performed after the mat and sensor assemblies are deployed. In some other embodiments, the installation of the sensors 150 takes place during the placement of the flexible composite mats 110 in the field. This can be a more manual approach of installing the sensors.

Installation of the system 100, particularly the mats 110 can also involve additional mat preparation steps. For instance, in an embodiment, the mats 110 can be in the form of a protective fabric mat that includes one or more layers of flexible material and a hardener (i.e., a settable material). The settable material can be distributed through the fabric layers and comprise, for instance, a cementitious mixture that is settable to a hardened material when activated by a liquid activator, such as water. As would be understood, when water is mixed with a cementitious material, it causes it to form a hardened structure. Installation of the mat 110 and sensors 150 on the pipeline 1 can preferably be performed while the mats are in a flexible state. After deployment of one or more of the mats in the trench or in relation to the pipeline and prior to backfilling, water can be applied to activate the hardener/settable material, resulting in a hardening of the one or more mats to form a structure having a sufficient rigidity to support the pipeline in the terrain and ensures the proper weight distribution. In an embodiment, the hardening of the bottom mat on which the pipeline rests can be performed before the pipeline is placed onto the mat. In an embodiment, the hardening of the mat can be performed after pipeline placement.

Figure 6:
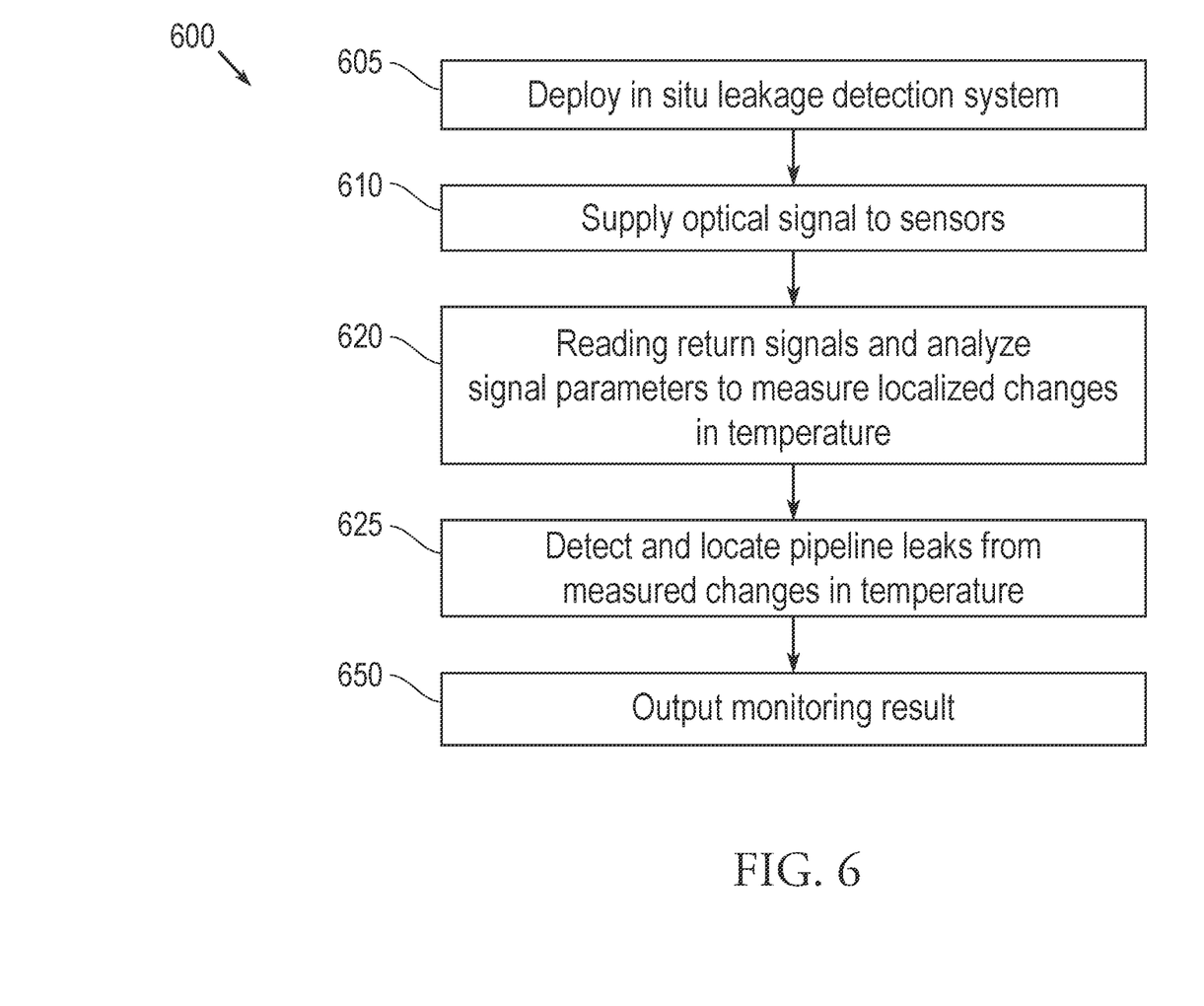
FIG. 6 is a flow diagram of an example method for deploying and monitoring a buried pipeline using an in situ leakage detection system, according to an embodiment.

FIG. 6 is a flow diagram of an example method 600 for deploying and performing in situ leakage detection for a buried nonmetallic pipeline, according to an embodiment. The method 600 is shown and described as being performed using the system 100 of FIG. 1 configured to measure temperature differential along the pipeline 1 using DOFS as the sensors 150 and the OTDR analysis techniques further shown and described in connection with FIG. 3.

Some or all of the method 600 can be performed using components and techniques illustrated in FIGS. 1 through 5. Portions of this and other methods disclosed herein can be performed on or using a custom or preprogrammed logic device, circuit, or processor, such as a programmable logic circuit (PLC), computer, software, or other circuit (e.g., ASIC, FPGA) configured by code or logic to carry out their assigned task. The device, circuit, or processor can be, for example, a dedicated or shared hardware device (such as a laptop, a single board computer (SBC), a workstation, a tablet, a smartphone, part of a server, or a dedicated hardware circuit, as in an FPGA or ASIC, or the like), or computer server, or a portion of a server or computer system. The device, circuit, or processor can include a non-transitory computer readable medium (CRM, such as read-only memory (ROM), flash drive, or disk drive) storing instructions that, when executed on one or more processors, cause portions of the method 600 (or other disclosed method) to be carried out. It should be noted that in other embodiments, the order of the operations can be varied, and that some of the operations can be omitted. Some or all of the method 600 can also be performed using logic, circuits, or processors located on or in electrical communication with the in situ leakage detection system configured to carry out the method 600.

The method 600 begins at step 605 in which the in situ leakage detection system 100 comprising flexible composite mats 110 and sensors 150 are provided in relation to a pipeline 1 and buried below the ground surface. Exemplary systems and methods for installing a flexible mat fabric as a structural support underneath buried pipeline and as a protective structure above the pipeline are shown and described herein and in co-pending and commonly assigned U.S. patent application Ser. No. 17/223,692, titled "Automated System and Installation Process for a Flexible Mat Fabric" filed on Apr. 6, 2021, referenced above and which is expressly incorporated by reference herein in its entirety.

For example and without limitation, the step of providing the in situ leakage detection and pipeline below ground can include the steps of: excavating a ground area to provide a trench, affixing one or more DOFS to the flexible mats; laying a first mat on the exposed ground within the trench; placing the pipeline onto the first mat and arranging the first mat relative to the pipeline such that the position of the DOFS relative to the pipeline is generally consistent for the length of the pipeline; laying a second mat over the pipeline and arranging the second mat such that the position of the DOFS in relation to the pipeline is generally consistent for the length of the pipeline; and connecting any above ground devices such as the OTDR reading unit and/or computing system 190 to the sensors; and backfilling the soil into the trench around and over the pipeline and mats.

The method 600 further includes steps directed to monitoring the temperature near the pipeline 1 using the system 100. More specifically, with respect to monitoring operations, the method 600 further includes, at step 610, the OTDR reading unit 195 supplying an optical signal to the input end of each of the sensors 150 via one or more optical input lines 192.

The method 600 further includes, at step 620, detecting the optical signals received back at the OTDR reading unit 195 from the sensors 150, respectively, and measuring one or more parameters relating to the received signals. More specifically, the OTDR reading unit can be configured to measure and analyze, a time-distance, frequency and amplitude of the Anti-Stoke components of Raman scattering signals received from each sensor. One or more of the OTDR reading unit 195 and the computing system 190, can be further configured to correlate the measured frequency and amplitude and time-distance information to changes in temperature localized at respective locations along the sensor's length represented by the time distances. The computing system/OTDR measures localized temperature variation (i.e., relative temperature) and determines time-distance from the Raman scattering signals through variation of signals received from sensors and the surrounding environment.

Additionally, at step 625, the measured changes in temperature are analyzed using one or more of the computing system 190 and the OTDR reading unit 195 to determine whether any localized changes in temperature are representative of a leak in the pipeline. Additionally, from the corresponding time-distance measurement, a corresponding location along the length of the pipeline 1 can be determined. For example, a leak can be detected based on an abrupt or unexpected change in temperature measured using one or more of the sensors 150 at or near a given time distance. Additionally, the time-distance associated with the measurements can be converted to a physical distance from the input end of the sensors (e.g., at 1500 m down the sensor's length) and, thus, the actual location of the leak in the pipeline can be determined. Additionally, the position of the leak can be localized in the circumferential direction about the pipeline based on a comparison of the measurements obtained using respective sensors 150 for a given time-distance. Although the foregoing steps describe first translating the measured parameters into a measure of temperature change before detecting leaks from the temperature measurements, it should be understood that, in some embodiments, the changes in the measured parameters (e.g., the frequency and amplitude of anti-Stoke components having a given time-distance) are representative of a localized change in temperature, and thus can be directly correlated to the existence of a leak.

In addition, the method 600 includes, at step 630, outputting the result of the monitoring step. This can include generating and outputting, using the monitoring computer system 190 and associated visual and audio output devices and communication interfaces, alerts in the event a leak or other out-of-specification parameters are detected from the sensor data. Step 630 can also include outputting the measured values of the parameters (e.g., temperature, temperature change) for real time viewing on a visual display and storing such information as necessary in a database or memory. Additionally, the monitoring system can be further configured to determine and output a location of the detected leak or measured parameters.

The methods described herein may be performed in part or in full by software or firmware in machine readable form on a tangible (e.g., non-transitory) storage medium. For example, the software or firmware may be in the form of a computer program including computer program code adapted to perform some or all of the steps of any of the methods described herein when the program is run on a computer or suitable hardware device (e.g., FPGA), and where the computer program may be embodied on a computer readable medium. Examples of tangible storage media include computer storage devices having computer-readable media such as disks, thumb drives, flash memory, and the like, and do not include propagated signals. Propagated signals may be present in a tangible storage media, but propagated signals by themselves are not examples of tangible storage media. The software can be suitable for execution on a parallel processor or a serial processor such that the method steps may be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to a viewer. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. An in situ leakage detection system for a buried nonmetallic pipeline, the system comprising:
   flexible composite mats, wherein the mats extend in a lengthwise direction along a length of the pipeline, the mats having an inner surface arranged to face an exterior surface of the pipeline, an exterior surface and a thickness therebetween;
   a plurality of distributed optical fiber sensor (DOFS) affixed to the inner surface of the mats and extending lengthwise along the mats for the length of the pipeline, the plurality of DOFS having an input end configured to be coupled to an optical time domain reflectometer (ORDR),
   wherein the mats are separate structures from the pipeline, wherein a first mat among the mats is disposed substantially above the pipeline and a second mat among the mats is disposed between a bottom of the pipeline and surrounding soil, and wherein at least a first DOFS among the plurality of DOFS is affixed to and extends lengthwise along a respective inner surface of the first mat and at least a second DOFS among the plurality of DOFS is affixed to and extends lengthwise along a respective inner surface of the second mat, and
   the mats having a first state in which they are flexible to facilitate insertion, and wherein the mats comprise a flexible composite fabric material including a water-activated hardener configured to, in response to application of water to the mat, cause the mats to set into a structure having a second state having hardness and rigidity sufficient to support the pipeline and distribute its weight to surrounding soil;
   a monitoring computing system comprising the OTDR, wherein the OTDR is configured to provide an optical input signal to the input end and measure parameters of a returned optical signal, and
   wherein the computing system is configured to detect a leak in the pipeline and a location of the leak as a function of the measured parameters.

2. The system of claim 1, wherein the OTDR is configured to measure localized changes in the parameters that are representative of a localized change in temperature occurring at a respective location along the DOFS.

3. The system of claim 2, wherein the parameters measured by the OTDR include a frequency and an amplitude and a time-distance of anti-Stoke components of Raman scattering.

4. The system of claim 2, wherein the monitoring computing system is configured to detect the localized change in temperature based on changes in the measured frequency and amplitude of the anti-Stoke components, detect the leak in the pipeline as a function of the localized change in temperature, and determine the location of the leak as a function of the measured time-distance.

5. The system of claim 4, further comprising a plurality of DOFSs affixed to an inner surface of the mats and extending the length in a generally parallel arrangement, whereby the mats extending along the pipeline serve to maintain the plurality of DOFSs at respective circumferential positions relative to the outer surface of the pipeline.

6. The system of claim 5, wherein the monitoring computing system is configured to measure changes in temperature in a direction about the circumference of the pipeline as a function of temperature measurements respectively measured using the plurality of DOFS.

7. The system of claim 1, wherein the plurality of DOFS are affixed to the mats by stitching.

8. The system of claim 1, wherein a third DOFS is affixed to the second mat and configured to extend lengthwise along the respective inner surface of the second mat generally parallel to the second DOFS.

9. The system of claim 1, wherein the material of the mats are sufficiently flexible in the first state to conform to a curvature of the pipeline such that at least a portion of the inner surface of the mats rest against the exterior surface of the pipeline.

10. The system of claim 1, wherein the mats are configured and arranged to support the pipeline against surrounding soil, protect the pipeline from external forces, and provide an interphase between the surrounding soil and the pipeline thereby alleviating a soil quality requirement for installation of the pipeline.

11. The system of claim 1, wherein the monitoring computing system is configured to generate an alert when a leak is detected.

12. A method of protecting an buried nonmetallic pipeline using an in situ leakage detection system, the method comprising:
providing an in situ leakage detection system under ground in relation to the nonmetallic pipeline, the in situ leakage detection system comprising:
one or more elongate flexible composite mats, wherein the mats extend in a lengthwise direction along a length of the pipeline, the mats having an inner surface arranged to face an exterior surface of the pipeline, an exterior surface and a thickness therebetween;
a plurality of distributed optical fiber sensor (DOFS) affixed to the inner surface of the mats and extending lengthwise along the mats for the length of the pipeline, the plurality of DOFS having an input end configured to be coupled to an optical time domain reflectometer (ORDR),
a monitoring computing system provided above ground and comprising the OTDR optically coupled to the input end of the plurality of DOFS,
wherein a first mat among the mats is disposed substantially above the pipeline and a second mat among the mats is disposed between a bottom of the pipeline and surrounding soil, and wherein at least a first DOFS among the plurality of DOFS is affixed to and extends lengthwise along a respective inner surface of the first mat and at least a second DOFS among the plurality of DOFS is affixed to and extends lengthwise along a respective inner surface of the second mat, and
the mats having a first state in which they are flexible to facilitate insertion, and wherein the mats comprise a flexible composite fabric material including a water-activated hardener configured to, in response to application of water to the mat, cause the mats to set into a structure having a second state having hardness and rigidity sufficient to support the pipeline and distribute its weight to surrounding soil;
providing, with the OTDR to the input end of the plurality of DOFS, an optical input signal;
measuring, with the OTDR from the input end, parameters of a returned optical signal;
detecting, with the computing system, a leak in the pipeline and a location of the leak as a function of the measured parameters.

13. The method of claim 12, wherein the measuring step comprises,
measuring localized changes in the parameters of the returned signal that are representative of a localized change in temperature occurring at a respective location along the plurality of DOFS, wherein the parameters measured by the OTDR include a frequency, an amplitude and a time-distance of anti-Stoke components of Raman scattering signals.

14. The method of claim 13, further comprising:
detecting, with the monitoring system, the localized change in temperature based on the measured frequency and amplitude of the anti-Stoke components;
detecting the leak in the pipeline as a function of the localized change in temperature; and
determining the location of the leak as a function of the measured time-distance.

15. The method of claim 13, wherein the in situ leakage detection system comprises a plurality of DOFSs affixed to the inner surface of the mats and extending the length in a generally parallel arrangement, and the method further comprising:
measuring, by the monitoring computing system, changes in temperature in a direction about the circumference of the pipeline as a function of temperature measurements respectively measured using the plurality of DOFS.

16. A method of protecting a buried nonmetallic pipeline using an in situ leakage detection system, the method comprising:
providing an in situ leakage detection system under ground in relation to the nonmetallic pipeline, the in situ leakage detection system comprising:
elongate flexible composite mats, wherein the mats extend in a lengthwise direction along a length of the pipeline, the mats having an inner surface arranged to face an exterior surface of the pipeline, an exterior surface and a thickness therebetween;
a plurality of distributed optical fiber sensor (DOFS) affixed to the inner surface of the mats and extending lengthwise along the mats for the length of the pipeline, the plurality of DOFS having an input end configured to be coupled to an optical time domain reflectometer (ORDR),
a monitoring computing system provided above ground and comprising the OTDR optically coupled to the input end of the plurality of DOFS,
providing, with the OTDR, to the input end of the plurality of DOFS, an optical input signal;
measuring, with the OTDR, from the input end, parameters of a returned optical signal;
detecting, with the computing system, a leak in the pipeline and a location of the leak as a function of the measured parameters, and
wherein the step of providing the in situ leakage detection system comprises:
excavating a ground area to provide a trench in which the pipeline and in situ leakage detection system is to be installed;
affixing the plurality of DOFS to the inner surface of the mats;
laying a first mat of the mats including a first DOFS within the trench;
placing the pipeline onto the first mat, wherein the first mat is laid down in the trench such that a position of the first DOFS in relation to the pipeline is generally consistent along the length of the pipeline;
laying a second mat including a second DOFS over the pipeline, wherein the second mat is laid down over the pipeline such that that a position of the second DOFS in relation to the pipeline is generally consistent along the length of the pipeline.

17. The method of claim 16, wherein the first mat and second mat comprise a flexible composite matting fabric including a water-activated hardener and, wherein the step of providing in situ leakage detection system further comprises:
applying water to the first mat and the second mat and thereby causing the first and second mat to harden and set; and
backfilling soil around and over the pipeline and the first mat and second mat.

18. The method of claim 16, wherein the affixing step comprises stitching the plurality of DOFS to the inner surface of the one or more mats prior to or during the laying steps.

* * * * *